United States Patent [19]

Hayakawa et al.

[11] Patent Number: 5,338,171
[45] Date of Patent: Aug. 16, 1994

[54] DIE-CLAMPING APPARATUS WITH ALIGNING DEVICE

[75] Inventors: Kohji Hayakawa, Komatsu; Yosuke Sasaki, Zama, both of Japan

[73] Assignee: Kabushiki Kaisha Komatsu Seisakusho, Tokyo, Japan

[21] Appl. No.: 952,359

[22] Filed: Sep. 28, 1992

[51] Int. Cl.⁵ .................. B29C 45/64; B29C 45/80
[52] U.S. Cl. .................. 425/138; 425/450.1; 425/451.9; 425/589; 425/595
[58] Field of Search .............. 425/138, 589, 590, 595, 425/450.1, 451.2, 451.9, DIG. 223

[56] References Cited

U.S. PATENT DOCUMENTS

| 3,078,515 | 2/1963 | Wintriss | 425/138 |
|---|---|---|---|
| 3,093,863 | 6/1963 | Ehlert | 425/595 |
| 3,540,524 | 11/1970 | Bachelier | 425/595 |
| 3,543,346 | 12/1970 | Breher | 425/595 |
| 3,729,283 | 4/1973 | Eggenberger et al. | 425/595 |
| 3,801,256 | 4/1974 | Farrell | 425/595 |
| 4,080,144 | 3/1978 | Hehl | 425/595 |
| 4,571,169 | 2/1986 | Shima et al. | 425/589 |
| 4,645,446 | 2/1987 | Hehl | 425/589 |
| 4,874,309 | 10/1989 | Kushibe et al. | 425/595 |
| 5,129,817 | 7/1992 | Ing et al. | 425/595 |

FOREIGN PATENT DOCUMENTS

| 61-26028 | 8/1986 | Japan . |
|---|---|---|
| 63-317423 | 12/1988 | Japan . |
| 1-232004 | 9/1989 | Japan . |
| 1-49088 | 10/1989 | Japan . |
| 2-9924 | 3/1990 | Japan . |
| 3-6880 | 1/1991 | Japan . |

Primary Examiner—James Mackey
Attorney, Agent, or Firm—Richards, Medlock & Andrews

[57] ABSTRACT

A molding apparatus with die-clamping and alignment devices has a stationary die plate for holding a stationary die, a movable die plate for holding a movable die, a device for moving forwardly/rearwardly the movable die plate with respect to the stationary die plate, a fastening device for fastening the movable die plate and the tie bar to each other by hydraulic force when the stationary die and the movable die have been approached to predetermined positions, and a tie bar for clamping the movable die and the stationary die by die-clamping force generated by a die-clamping cylinder, and a primary alignment mechanism provided for at least one junction among junctions between a piston of a die-clamping hydraulic cylinder and the tie bar, between a support plate and the tie bar, and between the movable die plate and a movable die plate support member, in order to permit the two dies to be aligned to each other by a secondary position alignment function, such as a guide pie for aligning the two dies at the time of clamping the dies.

36 Claims, 8 Drawing Sheets

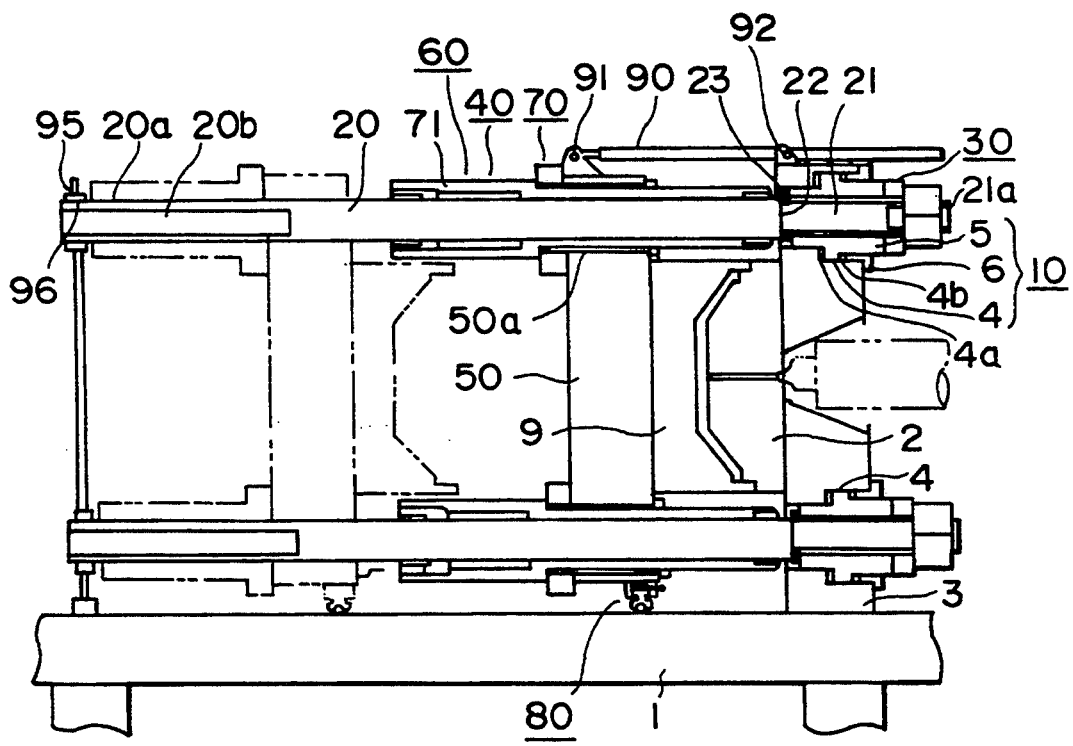
F I G. 1
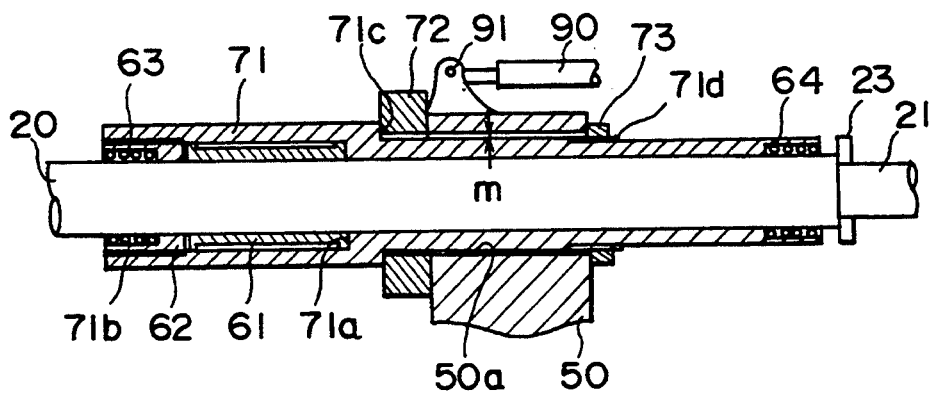
F I G. 2

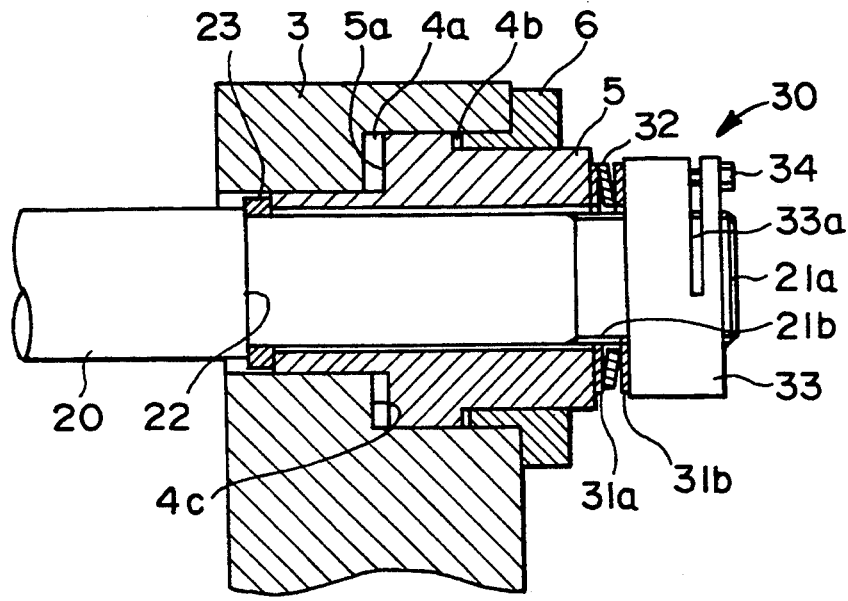
F I G. 3
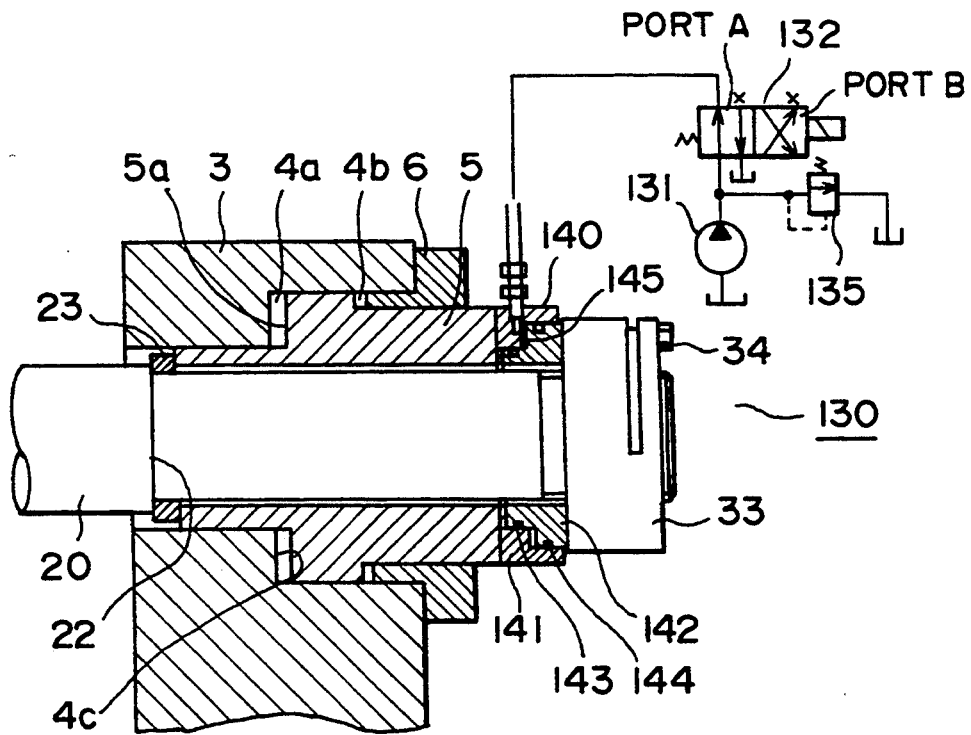
F I G. 4

DIE-CLAMPING APPARATUS WITH ALIGNING DEVICE

FIELD OF THE INVENTION

The present invention relates to molding apparatus which includes a die-clamping apparatus, e.g. an injection molding machine, an injection compressive molding machine, a die cast machine, or the like. In a particular aspect, the invention relates to a molding apparatus having a die-clamping and aligning device.

BACKGROUND OF THE INVENTION

Recently, the size of such molding machines has been enlarged, thereby requiring that the associated die-clamping apparatus have a large clamping force. On the other hand, it is desirable that the operation speed be increased in order to improve the manufacturing yield. With the trend to the larger sizes of such molding machines, there is a great need for reducing the installation area required by the larger machines.

A die opening/closing method, which has been mainly employed, is so arranged that the two dies are moved forwardly/rearwardly at a high speed by a small drive force to predetermined positions by using a long cylinder having a small diameter, the tie bar and the movable die plate are fastened to each other in the realized die-closed state where the two dies have come close to each other, and then a short cylinder having a large diameter is used to strongly clamp the dies. Since the operational capacity of the hydraulic cylinder is small enough according to the aforesaid method to improve the responsiveness of the hydraulic pressure, the cycle time can be shortened. Furthermore, the capacity of the hydraulic fluid supply tank can be reduced and therefore the area required to install the machine can be efficiently reduced. Therefore, a variety of inventions relating to the aforesaid method have been disclosed in recent years. Some of the inventions of the aforesaid type will now be described.

Conventional Example 1 (FIG. 9) has been disclosed in Japanese Published Examined Utility Model Application No. (Y2) 61-26028. According to that document, one end of a tie bar 304 is integrally formed with a piston 303 of a die-clamping hydraulic cylinder 302 fixed to a stationary die plate 301, while another end of the tie bar 304 is supported by a support plate 305. The tie bar 304 has a threaded portion 304a which receives a half nut 307 fitted to a movable die plate 306 so as to clamp the tie bar 304 and the movable die plate 306. The die opening/closing operation to be performed by the movable die plate 306 is effected by a hydraulic opening/closing cylinder 308 disposed between the two die plates 301 and 306. The top and the bottom surfaces of the threaded portion 304a of the tie bar 304 do not have the threads, so that the guiding of the opening/closing operation of the movable die plate 306 is performed by the aforesaid top and bottom surfaces having no threads. The clamping of the dies is accomplished by the tie bar 304 being clamped by the half nut 307 of the movable die plate 306, and then the die-clamping hydraulic cylinder 302 being used to draw the tie bar 304 along with the support plate 305. At this time, the support plate 305 supports the other end 304b of the tie bar 304 while sliding on the bed. The adjustment of the die-clamping range is performed at the time of changing the die, in a manner corresponding to the thickness of the subject die, by using region 304a of the tie bar 304 having the threads formed on the surface thereof. However, the deviation corresponding to the thread pitch must also be corrected. Therefore, the deviation is corrected in such a manner that the tie bar 304 is, together with the support plate 305, moved by an electric motor 309 to align the engagement position.

Conventional Example 2 (FIG. 10), which has been arranged so as to improve the Conventional Example 1 and which has been disclosed in Japanese Published Examined Utility Model Application No. (Y2) 61-26028, is constituted in such a manner that one end of a tie bar 321 is integrally formed with a piston 323 of a die-clamping cylinder 322 and has the shape of a perfect cylinder (i.e., having no threaded portion). The other end of the tie bar 321 is secured to a support plate 324. A tie bar penetration hole 325a, formed in a movable die plate 325, has a hydraulic clamping device 326 secured therein so as to secure the movable die plate 325 and the tie bar 321 at an arbitrary die-closing position which corresponds to the height of the die. Furthermore, die-clamping is so performed that the die-clamping hydraulic cylinder 322 drives the movable die plate 325 together with the tie bar 321 and the support plate 324 which is secured to the tie bar 321.

Conventional Example 3 (FIG. 11), which has been arranged so as to improve the Conventional Example 2 and which has been disclosed in Japanese Published Unexamined Patent Application No. (A) 1-232004, has one end of a tie bar 331 integrally formed with a piston located in hydraulic die-clamping cylinder chamber 337, and is constituted in such a manner that stopper rods 334 and 335 are disposed so as to quickly perform the alignment of the engagement position between a threaded portion 332 of a tie bar 331 and a half nut 333 for locking. Therefore, the clamping point of a movable die plate 336 can be assuredly determined.

Conventional Example 4 (FIG. 12), which has been arranged so as to improve the Conventional Example 3 and which has been disclosed in Japanese Published Examined Patent Application No. (B2) 2-9924, is constituted in such a manner that an engagement groove portion 346 for receiving a half nut 345 is formed at a front portion 344a of a tie bar 344, the other end of the tie bar 344 being formed integrally with a piston 343 of a die-clamping cylinder 342 provided for a stationary die plate 341. Furthermore, a die-closing end of the movable die plate 348 is restricted by a stopper 347, so that engagement can be assuredly carried out. In addition, in order to be adaptable to dies having various heights, the die-clamping cylinder 342 has a satisfactorily long stroke.

Conventional Example 5 (FIG. 13), disclosed in Japanese Published Unexamined Patent Application No. (A) 63-317243, is so arranged that a tie bar 352 is secured to a movable die plate 351, a die-clamping cylinder 354 including a double-rod type piston 353 having a hole 353a is included in a stationary die plate 355, a threaded portion 352a which is formed in the front portion of the tie bar 352 is received by a half nut 356, and the dies are clamped by the die-clamping cylinder 354. The deviation of the engagement position corresponding to the thread pitch, which has taken place at the time of aligning the heights of the dies, is corrected by shifting the piston position of the die-clamping cylinder 354 by a stopper leg 357 disposed on the back side of the die-clamping cylinder 354.

Conventional Example 6 (FIGS. 14 and 15), disclosed in Japanese Published Examined Patent Application No. (B2) 3-6880, is so arranged that the die-clamping apparatus is structured into a vertical apparatus, a tie bar 362 (a support column) is secured to a movable die plate 361 (an upper frame), and the tie-bar 362 is inserted into a hole formed in a double-rod type piston 364a having a hole of a die-clamping cylinder 364 secured to a stationary die plate 363 (a lower frame) so as to guide the forward/rearward movement of the movable die plate 361. A hydraulic clamping machine 365 (see FIG. 15) is included in the hole formed in the piston 364a, so that the tie bar 362 and the hydraulic clamping machine 365 are secured to each other and the dies are clamped in response to the application of oil pressure on piston 364a.

Conventional Example 7 (FIG. 16), disclosed in Japanese Published Examined Patent Application No. (B2) 1-49088, is arranged in such a manner that a tie bar 372 (a support column) is secured to a stationary die plate 371 (a lower frame), a hydraulic clamping machine 365 is included in a movable die plate 373 (an upper frame), and the tie bar 372 is inserted into a hole formed in a double-rod type piston 375 having a hole of a die-clamping cylinder 374 disposed on a movable die plate 373 so that the forward/rearward clamping movement of the movable die plate 373 is guided. The piston 375 includes a hydraulic clamping machine 365 so as to secure the tie bar 372 and the piston 375. Therefore, the movable die plate 373 is moved downwardly and die clamping is performed by the piston 375 in response to the application of pressurized oil thereto.

However, each of the aforesaid conventional examples encounters the following problems.

Conventional Example 1 (FIG. 9) raises a problem in that the aligning of the engagement position of the half nut 307 takes an excessive amount of time, the movable die plate 306 can easily be caught by the threads of threaded portion 304a because the tie bar 304 has no lateral stationary guide for guiding the movable die plate 306, and the insertion portion is too short. It is also difficult to form threads on the surface of the tie bar 304 because the threads are formed on only the right and the left surfaces. Furthermore, the arrangement wherein the tie bar 304 is integrally formed with the piston 303 of the die-clamping cylinder 302 will cause dimensional changes due to machining errors of the stationary die plate 301, the movable die plate 306, the tie bar 304, the support plate 305, and the like, due to a temperature difference, and due to the thermal stress resulting from the temperature difference. Accordingly, a gap must be present between the tie bar insertion hole formed in the movable die plate 306 and the outer surface of the tie bar 304, causing the die-clamping accuracy to deteriorate. What is worse, the movable die plate 306 cannot be moved smoothly if the temperature changes excessively.

Conventional Example 2 (FIG. 10) encounters a problem similar to that experienced with Conventional Example 1 in that the arrangement is made, similarly to Conventional Example 1, in such a manner that the tie bar 321 being integrally formed with the piston 323 of the die-clamping cylinder 322 will cause the dimensional changes due to the machining errors of the stationary die plate 327, the movable die plate 325, the tie bar 321, the support plate 324 and the like, due to a temperature change, and due to the thermal stress resulting from the temperature difference.

Conventional Example 3 (FIG. 11) encounters a problem which takes place because the insertion hole 336a of the movable die plate 336 and the threads 332 of the tie bar 331 undesirably interfere with each other. Furthermore, the die-clamping accuracy will easily deteriorate due to machining errors, due to the thermal stress resulting from the temperature changes, or due to deformations which take place as a result of a deviated load, and the like.

Conventional Example 4 (FIG. 12) is so arranged that the movable die plate 348 and the tie bar 344 are separated from each other, causing the size of the die-clamping cylinder 342 to be enlarged excessively. Therefore, the hydraulic control responsiveness deteriorates. Furthermore, the tie bar 344 is formed as a cantilever structure. Therefore, the front portion 344a inclines downwardly, causing a positional deviation from the insertion hole 348a to easily take place. What is even worse, a seal (omitted from illustration) of the die-clamping cylinder 342 can be easily damaged in actual use. In addition, the rigidity of the tie bar 344 does not substantially contribute to the deviated load at the time of the installation of the die to the movable die plate 348. Therefore, a guide means for guiding the movable die plate 348 must have satisfactory accuracy and rigidity, causing the cost to be raised and the required installation area to be enlarged excessively.

Conventional Example 5 (FIG. 13) is so arranged that the tie bar 352, which has been separated from the piston hole 353a of the die-clamping cylinder 354, is inserted into the piston hole 353a at the time of clamping the dies. Therefore, the deviated load due to the weight of the movable die 358 and that of the tie bar 352 and the gap of the die opening/closing guide portion for guiding the movable die plate 351 will deviate the center of the piston hole 353a and that of the tie bar 352 from each other, causing an interference to take place. What is worse, the die-clamping hydraulic cylinder 359 is positioned upwardly away from the die opening/closing guide portion for guiding the movable die plate 351. Therefore, the gap of the die opening/closing guide portion cannot be made constant because the movable die plate 351 is opened/closed by the die-clamping hydraulic cylinder 359. Hence the quantity of the inclination of the movable die plate 351 becomes too large, causing problems of damages of the piston 353 and the half nut 356 of the die-clamping cylinder 354 to arise due to the asynchronous action of the two die guides or the interference of the tie bar 352. Since the rigidity of the tie bar 352 does not substantially contribute to the deviated load, the portion for guiding the die opening/closing operation to be performed by the movable die plate 351 must have sufficient rigidity. Therefore, the cost cannot be reduced and the required installation area becomes too large.

In Conventional Example 6 (FIGS. 14 and 15), a large gap must be formed between the sleeve 365a of the hydraulic clamping machine 365 and the tie bar 362 to absorb the machining errors and the thermal deformation of the main frame and members of each of the stationary die plate 363, the movable die plate 361, the tie bar 362, and the like. In order to improve the durability, the gap must also be enlarged. Hence, the quantity of deformation of the sleeve of the hydraulic clamping machine 365 becomes too large, causing the force for clamping the tie-bar 362 and the sleeve 365a to be reduced. What is worse, the arrangement wherein the hydraulic clamping machine 365 is included in the piston 364a of the die-clamping cylinder 364 will cause a difficulty in that disassembly and repair cannot be easily performed.

In Conventional Example 7 (FIG. 16), the size of the piston 375 so arranged that the hydraulic clamping machine 365 is included in the movable die plate 373 become too large and the weight of the same becomes too heavy. Since the large and heavy piston 375 is included by the movable die plate 373, the weight of the movable member of the movable die plate 373 becomes very heavy. Hence, controls of the acceleration and deceleration of the operations of opening/closing the dies cannot easily be performed due to the excessively heavy weight of the movable member. Furthermore, the fact that a large quantity of oil must be supplied to the die-clamping cylinder 374 and that the die-clamping cylinder 374 is included in the movable die plate 373 will cause the diameter of a rubber hose (omitted from illustration) to be enlarged. Hence, the bending radius and the operational range becomes too large, causing a problem to arise in that the size of the machine cannot be reduced. As a result, maintenance cannot be performed easily and the appearance deteriorates. In addition, problems similar to Conventional Example 6 arise in that the realized durability and the clamping force of the hydraulic clamping machine are unsatisfactory, and disassembly and repair cannot be performed easily.

As can be understood from the above description, the dimension changes of the stationary die plate, the movable die plate, the tie bar, the support plate, and the like, which take place due to the machining errors and the thermal stress resulting from the temperature difference will cause problems in that the alignment cannot be realized or the accuracy deteriorates since a large gap is formed. In addition, the arrangement so made that the hydraulic clamping machine is included by the piston of the die-clamping cylinder will hamper disassembly and repair. Consequently, they are not suitable to serve as a die-clamping apparatus.

SUMMARY OF THE INVENTION

An object of the present invention is to provide a new and improved molding apparatus. Another object of the invention is to provide an improved die-clamping apparatus. Another object of the invention is to provide a new and improved alignment device for a molding machine.

The molding apparatus has a stationary die plate for holding a stationary die, a movable die plate for holding a movable die, a hydraulic cylinder for moving the movable die plate forwardly/rearwardly with respect to the stationary die plate, and a tie bar for clamping the movable die and the stationary die through the use of a die-clamping force generated by a die-clamping cylinder. One or more alignment devices can be provided so as to join the movable die and the stationary die in such a manner that primary alignment can be performed. The molding apparatus can be provided with a guide pin for secondarily aligning the movable die with respect to the stationary die when the stationary die and the movable die have been placed at predetermined positions.

In one embodiment, the alignment mechanism is so arranged that a die-clamping hydraulic cylinder including a double rod type hollow piston is secured to the stationary die plate, and the hollow piston and the tie bar are joined via a flexible alignment mechanism in such a manner that the alignment can be performed.

In another embodiment, the alignment mechanism is so arranged that the tie bar penetrates a movable die plate support member, and the movable die plate support member is joined to the movable die plate via an alignment device in such a manner that the alignment can be performed.

In a third embodiment, the alignment mechanism is arranged between a support plate and the tie bar in order to cause the two dies to be aligned to each other by a position alignment function such as a guide pin for aligning the two dies at the time of clamping the dies.

In each embodiment, fastening means can be provided for fastening the movable die plate and the tie bar to each other by hydraulic force when the stationary die and the movable die have approached predetermined positions. Also, in each embodiment, a mechanism can be fastened to the movable die plate to provide for a rolling or sliding movement of the movable die plate.

Other and further objects, features and advantages of the invention will be appear more fully from the following description.

BRIEF DESCRIPTION OF THE DRAWINGS

FIG. 1 is an overall structural view which illustrates a molding apparatus employing die-clamping and alignment devices in accordance with the present invention;

FIG. 2 is a partially enlarged view which illustrates the movable die plate support member shown in FIG. 1;

FIG. 3 is a partial cross sectional view which illustrates an embodiment of an alignment mechanism positioned between a die-clamping cylinder and a tie bar in accordance with the present invention;

FIG. 4 is a partial cross sectional view which illustrates an embodiment of an automatic alignment mechanism positioned between a die-clamping cylinder and a tie bar in accordance with the present-invention;

DESCRIPTION OF THE PREFERRED EMBODIMENTS

Figure 5:
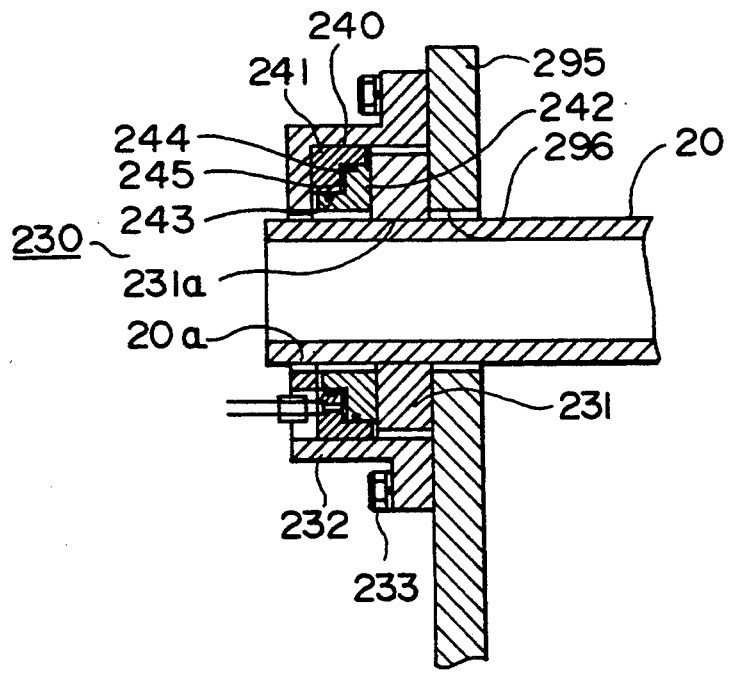
FIG. 5 is a partial cross sectional view which illustrates an embodiment of an automatic alignment mechanism positioned between a tie bar and a support plate in accordance with the present invention.

FIG. i illustrates a molding apparatus employing die-clamping and alignment devices wherein a stationary die plate 3 for holding a stationary die 2 is secured to an end portion of a bed 1 of an injection molding machine or the like. A plurality of hydraulic cylinder chambers 4 are formed, e.g. by cutting, in the stationary die plate 3. Each of the hydraulic cylinder chambers 4 has a double-rod type piston 5 having a hollow hole extending coaxially therethrough (hereinafter called a "hollow piston") hermetically inserted therein. A piston cover 6 is inserted into each hydraulic cylinder chamber 4, each respective piston cover 6 being secured to the stationary die plate 3. Each hydraulic cylinder chamber 4 is divided by a hollow piston 5 into cylinder chambers 4a and 4b at the two ends thereof. Each thus arranged hydraulic cylinder chamber 4, hollow piston 5 and piston cover 6 constitute a die-clamping cylinder 10 which is supplied with pressurized oil from a pump (omitted from illustration) so as to clamp a stationary die 2 and a movable die 9. A plurality of the die-clamping cylinders 10 are disposed adjacent to the outer ends of the stationary die plate 3. According to a presently preferred embodiment, four die-clamping cylinders 10 are so positioned that at each of the four corners of the stationary die plate 3 a die-clamping cylinder 10 is disposed, to thereby be adaptable to the most common die-clamping apparatus.

A tie bar 20 has a stepped portion 22 formed by thinning an end portion 21 (in the right portion of FIG. 1) by cutting. A spacer 23, the hollow piston 5 and an alignment mechanism 30 are positioned in sequence on the stepped portion 22 in a direction toward a front end 21a of the end portion 21. A hollow hole 20b is formed in a left end portion 20a (as viewed in FIG. 1) of the tie bar 20 which is not affected by a die-clamping force. The hollow hole 20b may be made by drilling or by welding a hollow material. A plurality of the tie bars 20 are disposed in such a manner that each tie bar 20 is fastened to a respective hollow piston 5. According to this embodiment, four tie bars 20 are so positioned that at each of the four corners of the stationary die plate 3 a tie bar 20 is disposed, to be adaptable to the most common die-clamping apparatus. A movable die plate assembly 40, for guiding and supporting the tie bars 20, slides to the right and the left (as viewed in FIG. 1). The movable die plate assembly 40 is composed of a movable die plate 50, a movable die plate support member 60, and an alignment device 70. The movable die plate assembly 40 is supported by rollers 80 on bed 1.

The movable die plate 50 has holes 50a in the four corner portions thereof, each hole 50a having a tie bar insertion pipe 71 for the alignment device 70. The stationary die plate 3 and the movable die plate 50 are connected to each other by a die opening/closing hydraulic cylinder 90. The die opening/closing hydraulic cylinder 90 is so fastened that its rod side is connected to the movable die plate 50 by a pin 91 and its cylinder side is movably connected to the stationary die plate 3 with a pin 92. When the die opening/closing hydraulic cylinder 90 extends/contracts, the movable die plate assembly 40 is moved rearwardly/forwardly with respect to the stationary die plate 3. The movable die plate 50 has a movable die 9 fastened thereto. The stationary die 2 has a guide pin 7 (FIG. 7) fastened thereto for insertion into the opening of bush 8 (FIG. 7) located in the movable die 9, to thereby perform the secondary, final alignment of the stationary die 2 and the movable die 9.

Rollers 80, arranged to make the upper surface of the bed 1 to be a roll-guiding surface, are disposed below the movable die plate 50 when viewed in FIG. 1. Each movable die plate support member 60 supports and uses the respective tie bar 20 as a guide so that the movable die plate support member 60 is able to slide to the right and left. The left end portion 20a of each tie bar 20 projects beyond the left end surface of the respective tie bar insertion pipe 71, even if the movable die plate assembly 40 is at the fully opened position (designated by the line of alternating one long and two short dashes). Furthermore, the left end portion 20a can be, in the axial direction, slidably and hermetically inserted into a boss hole 96 in a support plate 95 regardless of whether the movable die is at the fully opened position or the fully closed position, with the support plate 95 being fixedly secured to the bed 1. Incidentally, in another arrangement which can be employed, the support plate 95 is slidably positioned on the bed 1, e.g. by a roller mechanism 80, and the left end portion of the tie bar 20 is, in the axial direction, slidably and hermetically inserted into the boss hole 96 formed in the support plate 95, in the manner of the embodiment illustrated in FIG. 5.

FIG. 2 is a partially enlarged view which illustrates a movable die plate support member 60, shown in FIG. 1, for supporting the movable die plate 50. The tie bar insertion pipe 71 of the movable die plate support member 60 extends through a hole 50a formed in the movable die plate 50. The diameter of the hole 50a is greater than the diameter of the portion of the tie bar insertion pipe 71 which is in hole 50a, so as to provide a gap (m) between the tie bar insertion pipe 71 and the movable die plate 50 in the hole 50a. The tie bar 20 extends from the support plate 95 through a hole in the tie bar insertion pipe 71 to the stationary die plate 3 to guide the movable die plate support member 60 and to provide for clamping the movable die 9 and the stationary die 2 by the die-clamping force generated by the die-clamping hydraulic cylinder 10.

A hydraulic fastening device 61, for example a hydraulic clamping machine manufactured by Nitomak ER, is inserted into the tie bar insertion pipe 71 for selectively fastening movable die plate support member 60 and tie bar 20 to each other by hydraulic force. Bearing retainer 62 secures the fastening device 61 to a rearwardly facing inner shoulder 71a of the axial hole through the tie bar insertion pipe 71 in such manner that the fastening device 61 is not moved in the axial direction in the tie bar insertion pipe 71. The bearing retainer 62 is fastened in such a manner that a thread formed by cutting on the outer surface of the bearing retainer 62 and a thread 71b formed in the inside surface of the axial hole through the tie bar insertion pipe 71 are engaged to each other.

Linear ball bearings 63 and 64 are respectively disposed inside the bearing retainer 62 and inside the tie bar insertion pipe 71 at positions to contact the tie bar 20 at spaced apart locations along the length of the tie bar 20, so that the movable die plate assembly 40 smoothly slides in the axial direction of the tie bar 20 in response to the action of the die-opening/closing hydraulic cylinder 90 while supporting and using the tie bar 20 as a guide.

The tie bar insertion pipe 71, which is preferably coaxial with tie bar 20, is elongated along the axis of tie bar 20. At least a substantial portion of the tie bar insertion pipe 71 extends along tie bar 20 from the movable die plate 50 toward the stationary die plate 3 regardless of the position of the movable die plate 50 with respect to the tie bar insertion pipe 71. In a presently preferred embodiment, the tie bar insertion pipe 71 is sufficiently elongated that a substantial portion of the tie bar insertion pipe 71 also extends along the tie bar 20 from the end of the movable die plate 50 which is remote from the stationary die plate 3 toward the support plate 95 regardless of the position of the movable die plate 50 with respect to the tie bar insertion pipe 71. The portion of the movable die plate support member 60 adjacent to the linear ball bearing 64 (adjacent to the stationary die plate 3) is fastened to a position on the side of the stationary die 2 or the movable die 9 and which overlaps an axial directional space which is required for the die. Therefore, the distance along which the movable die plate support member 60 is supported on the tie bar 20 is extended so that the strength of supporting the deviated load moment of the movable die plate assembly 40 can be enlarged, causing the accuracy of the parallelism of the movable die plate 50 with respect to the stationary die plate 3 to be improved. As a result, the die alignment can be accurately performed. Furthermore, the distance of the supporting point between the linear ball bearings 63 and 64 can be lengthened, causing sliding of the movable die plate 50 to be performed smoothly.

The alignment device 70 is composed of the tie bar insertion pipe 71, a collar 72, and a nut 73. The tie bar insertion pipe 71 is disposed so as to have the gap (m) from the hole 50a formed in the movable die plate 50. The collar 72 has an end portion positioned in contact with a forwardly facing shoulder surface 71c of the tie bar insertion pipe 71 on the side of the movable die plate 50 which is remote from the stationary die plate 3. The other end portion of the collar 72 is positioned in contact with the movable die plate 50. The nut 73 is received by external threads 71d formed, e.g. by cutting, on a portion of the outer surface of the tie bar insertion pipe 71 which is between the shoulder 71c and the stationary die plate 3. The threaded engagement between nut 73 and the external threads 71d secure the movable die plate 50 between shoulder 71c and the nut 73. The collar 72 may be integrally formed with the movable die plate 50 or with the tie bar insertion pipe, or may be omitted from the structure so as to position the movable die plate 50 in direct contact with the shoulder end surface 71c of the tie bar insertion pipe 71. The nut 73 lightly clamps the movable die plate 50 and the collar 72 so as to cause the tie bar insertion pipe 71 to move with respect to the movable die plate 50 in order to perform the alignment action. It is preferable that a set screw or the like (omitted from illustration) be used to secure the collar 72 in order to prevent the undesirable rotation of the collar 72. Thus, the alignment device 70 joins the movable die plate 50 to the movable die plate support member 60 in such a manner that the alignment of the movable die plate 50 with respect to the tie bar 20 can be performed.

FIG. 3 illustrates an embodiment of an alignment mechanism positioned between the die-clamping cylinder 10 and the tie bar 20. Referring now to FIG. 3, the alignment mechanism 30 is fastened to an end portion of the hollow piston 5 adjacent to the front end portion 21a of the tie bar 20, the alignment mechanism 30 being constituted by two flat washers 31a and 31b, at least one conical spring 32, a threaded element 33, and a bolt 34. Each of the washers 31a and 31b, the at least one conical spring 32, and the threaded element 33 are positioned about the tie bar 20, and preferably at least substantially coaxially therewith. An end portion of the washer 31a is positioned in contact with the hollow piston 5 and the other end portion of the washer 31a is positioned in contact with the conical spring 32. An end portion of the washer 31b is positioned in contact with the at least one conical spring 32 and the other end portion of the washer 31b is positioned in contact with the threaded element or nut 33 which is in turn secured by thread engagement with an externally threaded portion of the tie bar 20. The at least one conical spring 32 is interposed between the two washers 31a and 31b while leaving a squeezing allowance which corresponds to a predetermined alignment quantity, the at least one conical spring 32 being further secured in place by the nut 33 with a predetermined tightening force. The nut 33 has a slit 33a formed therein by cutting, the threads of the nut 33 being engaged by the threaded front end portion 21b of the end portion 21 of the tie bar 20, The nut 33 is tightened by the bolt 34 so that the nut is secured to a predetermined position on the tie bar 20.

FIG. 4 illustrates an automatic alignment mechanism 130 positioned between the die-clamping cylinder 10 and the tie bar 20. The automatic alignment mechanism 130 is fastened to the front portion of the tie bar 20 adjacent to the hollow piston 5 inserted into the stationary die plate 3, the automatic alignment mechanism 130 being composed of a hydraulic actuator 140, the nut 33 and the bolt 34. The actuator 140, which is positioned between the hollow piston 5 and the front end portion of the tie bar 20, is composed of a cylinder housing 141 mounted in contact with the front end of hollow piston 5, a piston rod 142 mounted in contact with nut 33, and "0" rings 143 and 144, so as to serve as a flat single-action cylinder having a hollow hole. The piston rod 142 is slidably positioned in a hydraulic annular cylinder chamber 145 which is formed between the cylinder 141 and the piston rod 142, the annular cylinder chamber 145 being so arranged as to receive pressurized hydraulic fluid supplied from a pump 131 via an electromagnetic change-over valve 132. Furthermore, a relief valve 135 is disposed between the pump 131 and the electromagnetic change-over valve 132 so that predetermined pressure is supplied to the cylinder chamber 145 when the electromagnetic change-over valve 132 is operated (when the pump 131 and the cylinder chamber 145 are connected to each other at a port A) in accordance with an instruction transmitted from a controller, a switch, or the like (omitted from illustration). Since the nut 33 is structured and operated in the same manner as that according to the first embodiment shown in FIG. 3, the description is omitted here.

Although the aforesaid structure is so arranged that the tie bar 20 is hermetically held in the boss hole 96 of the support plate 95, a further satisfactory effect can be obtained from the arrangement of an automatic alignment mechanism positioned between a tie bar and a support plate, as illustrated in FIG. 5, wherein the support plate 295 is slidably positioned on the bed 1 and the left end portion of the tie bar 20 is, in the axial direction, slidably and hermetically inserted into the boss hole 296 formed in the support plate 295.

The automatic alignment mechanism 230 joins the tie bar 20 to a support plate 295, regardless of the position of the movable die plate 50, in such a manner that alignment of the tie bar 20 with respect to the support plate 295 can be performed. The automatic alignment mechanism 230 is fastened to the other end portion 20a of the tie bar 20 adjacent to the support plate 295, the automatic alignment mechanism 230 being composed of a tie bar plate 231, an actuator 240, a cover 232, and a bolt 233. The support plate 295 has a hole 296 having a diameter which is larger than that of the tie bar 20 and is of a size required to perform the alignment to the tie bar 20, so that tie bar 20 can be freely moved in hole 296. The tie bar 20 is inserted through a hole 231a which is hermetically formed in the tie bar plate 231.

One side of the tie bar plate 231 is positioned in contact with the side of the support plate 295 which is remote from the stationary die plate 3, while the other side of tie bar plate 231 is positioned in contact with a piston rod 242 of a hydraulic actuator 240 which is similar to the hydraulic actuator 140 of FIG. 4. The actuator 240 is composed of a housing cylinder 241 mounted in contact with cover 232, a piston rod 242 mounted in contact with tie bar plate 231, and "0" rings 243 and 244, the actuator 240 being formed into a flat single-action cylinder having a hollow hole. A hydraulic annular cylinder chamber 245 is formed between the cylinder 241 and the piston rod 242 so that the piston rod 242 is positioned for slidable movement in the chamber 245. The actuator 240 is disposed between the cover 232 and the support plate 295, the cover being secured to the support plate 295 by the bolt 233 so as to enclose the tie bar plate 231 and the actuator 240. The cylinder chamber 245 in the actuator 240 is supplied with pressurized oil from the pump similarly to the actuator 140 of FIG. 4. Furthermore, the electromagnetic change-over valve 132 and the relief valve 135 can be associated with the cylinder chamber 245 so as to provide the control of the actuator 240.

Figure 6:
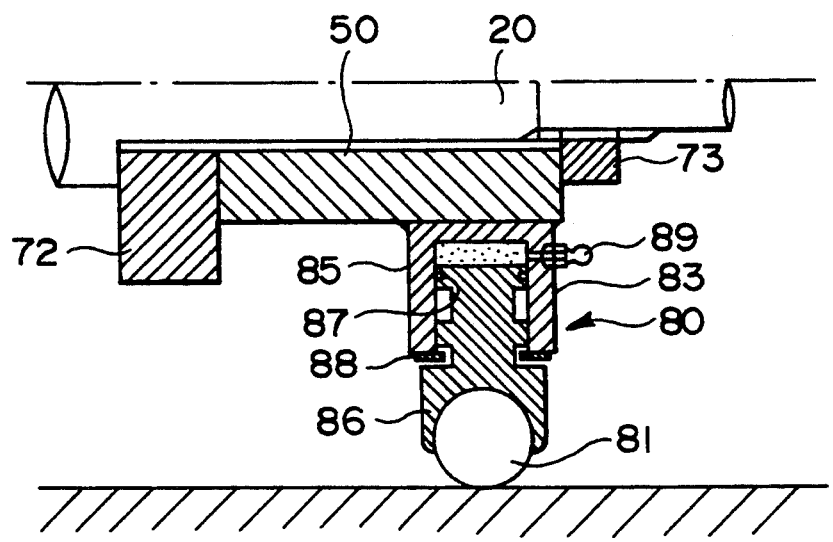
FIG. 6 is a partially enlarged view which illustrates a roller mechanism in accordance with the present invention.

FIG. 6 illustrates an embodiment of the roller mechanism 80. The roller mechanism 80 is secured to the lower portion of the movable die plate 50, and is composed of a roller, in the form of a ball 81, and an adjustable mounting means, in the form of a hydraulic cylinder 83. The adjustable mounting means mounts the roller 81 to the movable die plate so that the roller 81 moves on a roller guide surface provided by the bed 1. The hydraulic cylinder 83 is composed of a tube 85, a rod 86, an "O" ring 87, a retaining plate 88 and a plug 89. The rod 86 holds the ball 81. The plug 89 is secured to the tube 85, the plug 89 providing for the supply/discharge of oil to/from the hydraulic cylinder 83 for the purpose of adjusting the height of the movable die plate support member 60, relative to the rolling guide surface of the bed 1.

Although the aforesaid embodiment is arranged to employ the hydraulic cylinder 83, a threaded structure may be employed so as to adjust the height of the movable die plate support member. Although one hydraulic cylinder is employed according to the illustrated embodiment, two or more hydraulic cylinders may be disposed on each side.

Figure 7:
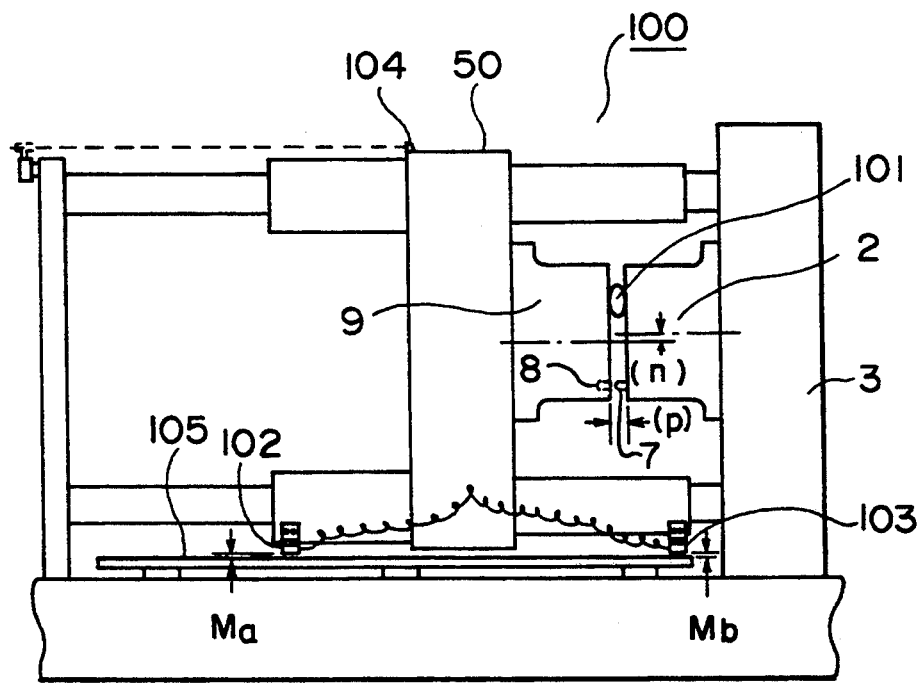
FIG. 7 is an overall structural view which illustrates a detection mechanism for detecting inclination deviation, positional deviation and alignment deviation of a movable die plate and automatically stopping the operation, according to the present invention.

FIG. 7 illustrates an embodiment of a detection mechanism 100 of a device for detecting at least one of the inclination deviation, positional deviation and alignment deviation of the movable die plate 50, and for automatically stopping the operation when an excessively large deviation of the movable die plate 50 is detected. Referring to FIG. 7, if resin, foreign matter, or the like 101 is caught between the dies, the movable die plate 50 can become inclined or encounter a positional deviation (p) in the axial distance between the dies. If the temperature of only a portion including the stationary plate 3 has been raised, an alignment deviation (n) can take place between the longitudinal axis of the stationary die 2 and the longitudinal axis of the movable die 9. Accordingly, distance detection sensors 102 and 103 for detecting the inclination and the alignment deviation in a non-contact manner are disposed adjacent to the movable die plate 50. A position detection sensor 104 for determining the positional deviation by detecting the distance between the dies in the axial direction (right and left directions when viewed in FIG. 7) is disposed adjacent to the movable die plate 50. A rail 105 to be detected by distance sensors 102 and 103 is secured to the top surface of the bed 1. The distance detection sensors 102 and 103 respectively measure distances $M_a$ and $M_b$ to the rail 105 to be detected, and transmit the results of the measurements to a controller (omitted from illustration) in which the alignment deviation is calculated by $[(M_a+M_b)/2)]$ and the inclination is calculated in accordance with a predetermined formula (for example, the inclination of the movable die plate can be expressed by $(M_a-M_b)$. If the obtained value is larger than a predetermined threshold value, a signal is transmitted to an electromagnetic hydraulic pressure changeover valve (omitted from illustration) for controlling the die opening/closing hydraulic cylinder 90 so as to change over the die opening/closing hydraulic cylinder 90 to a neutral position. As a result, the operation of the die opening/closing hydraulic cylinder 90 is interrupted so as to emergency stop the movement of the movable die plate 50. The position detection sensor 104 detects the distance between the dies in the axial direction so as to transmit the result of the detection to the controller in which a determination is made as to whether or not the die is stopped at a predetermined position in accordance with a result of a comparison made with a command value. If it is larger than a predetermined value, a determination is made that a foreign matter is caught and therefore the movement of the movable die plate 50 is emergency stopped in the case of the positional deviation detection.

Figure 8:
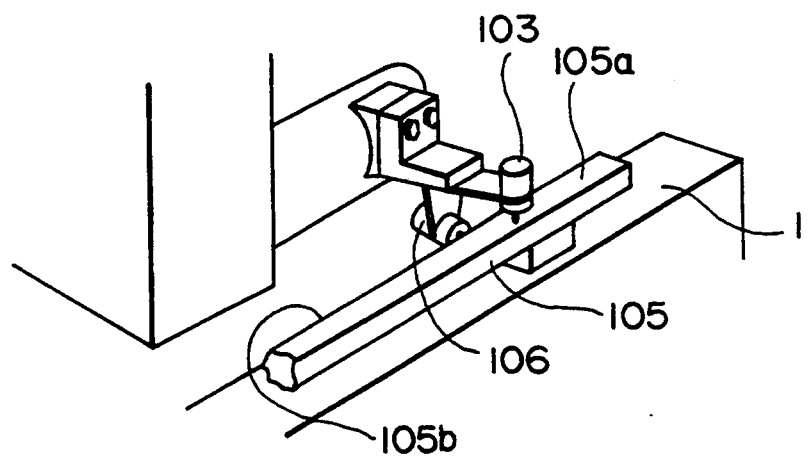
FIG. 8 is a partial structural view which illustrates a second embodiment of the detection mechanism for detecting inclination deviation, positional deviation and alignment deviation of a movable die plate and automatically stopping the operation according to the present invention.
Figure 9:
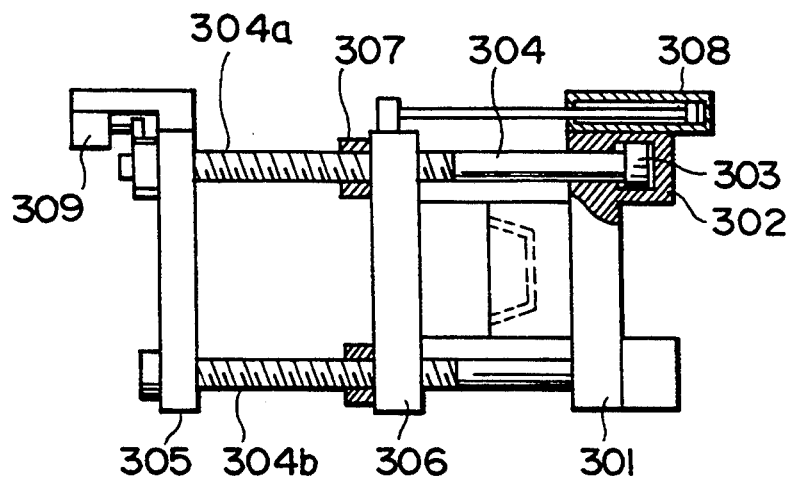
FIGS. 9 to 16 are overall structural views, each of which illustrates a conventional molding apparatus having a die-clamping device.
Figure 10:
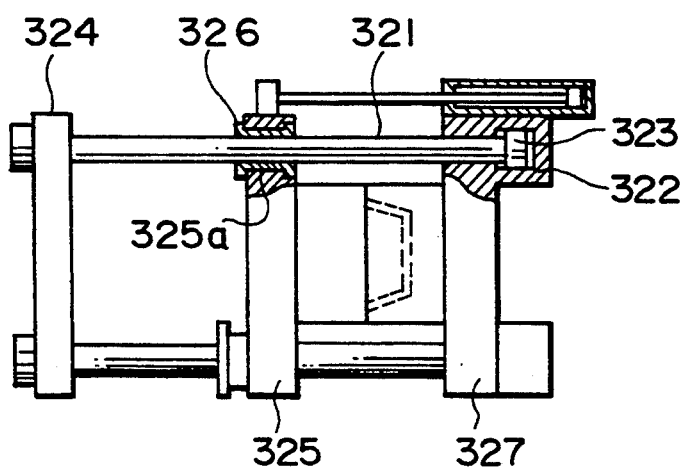
Figure 11:
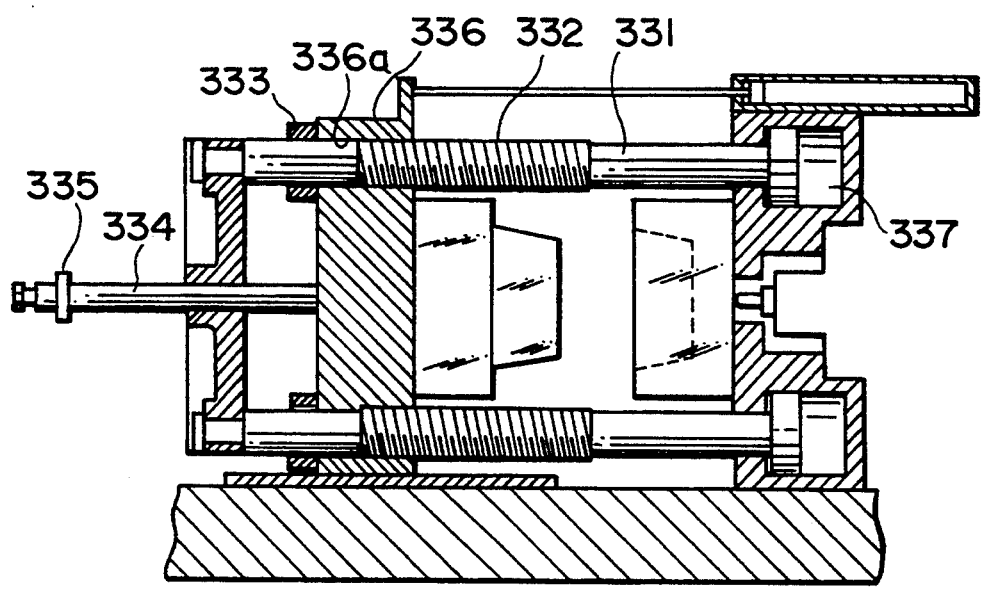
Figure 12:
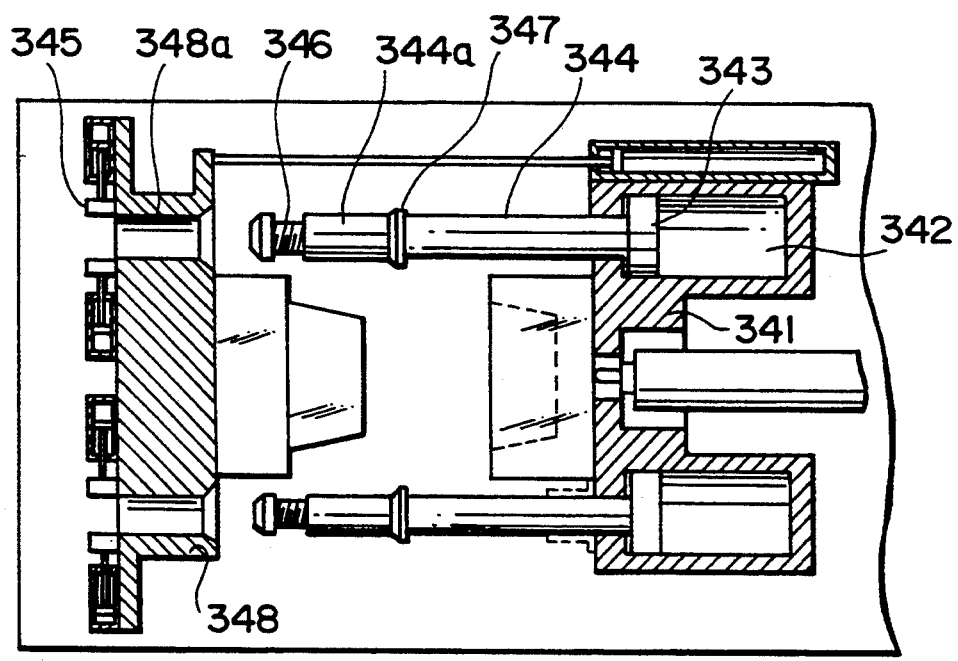
Figure 13:
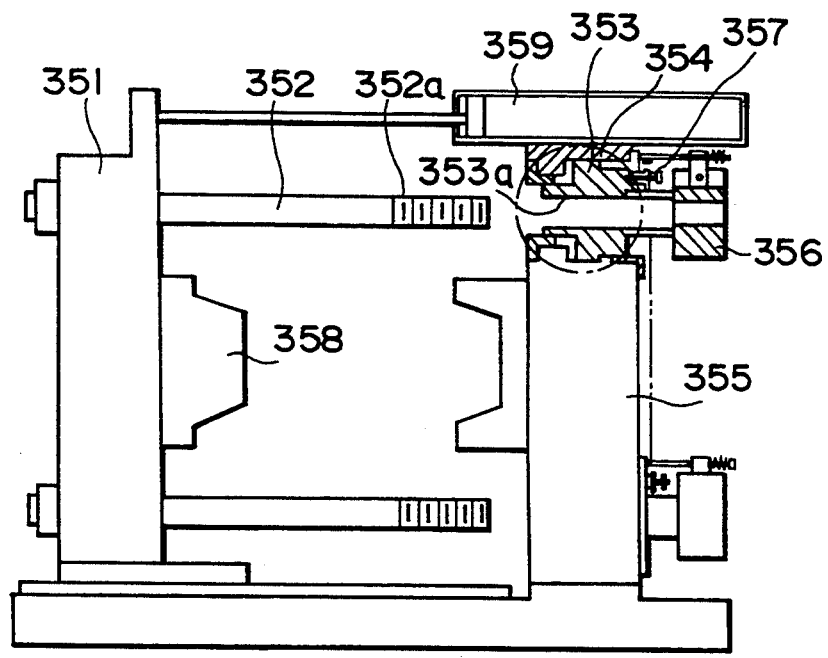
Figure 14:
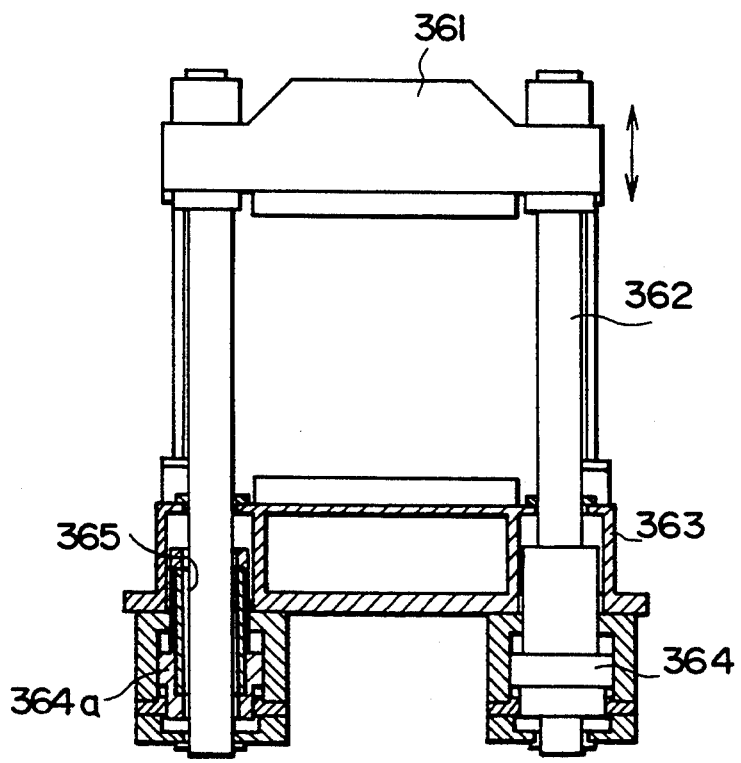
Figure 15:
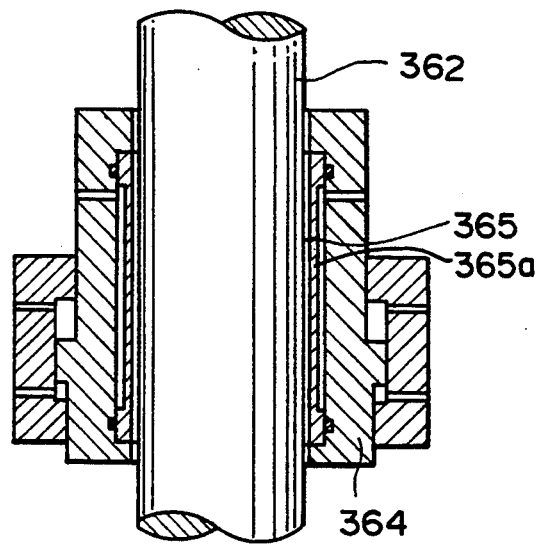
Figure 16:
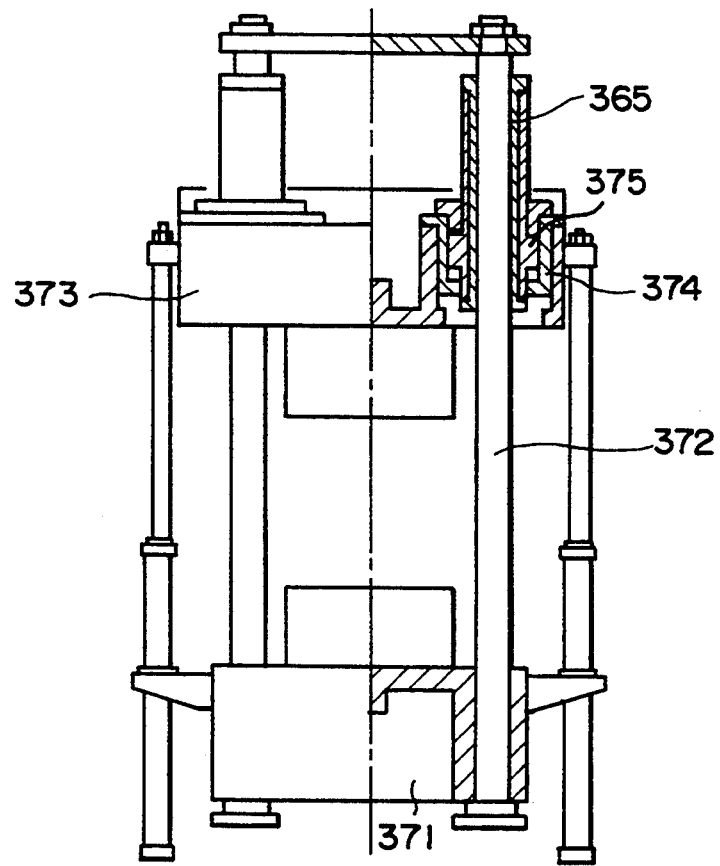

Although the aforesaid embodiment is arranged to detect the alignment deviation and the inclination in the vertical direction (the vertical direction when viewed in FIG. 7), the same in the horizontal direction (the longitudinal direction of FIG. 7) may be detected similarly. In this case, an arrangement illustrated in FIG. 8 may be employed in which the rail 105 to be detected is used to detect both the distance in a vertical direction to surface 105a and the distance in a horizontal direction to surface 105b, and a distance detection sensor 106 is added for detecting the lateral direction. Although the aforesaid embodiment is arranged to fasten the detection mechanism to one or more of the lower tie bars, the same may be fastened to one or more of the upper tie bars or to all of the tie bars.

The operation of the aforesaid structure will now be described. When the dies are installed, the stationary die 2 and the movable die 9 are respectively fastened to the stationary die plate 3 and the movable die plate 50, and the two dies 2 and 9 are allowed to come closer by operating the opening/closing hydraulic cylinder 90. At the time of the daily start, the two dies 2 and 9 are allowed to come closer by operating the opening/closing hydraulic cylinder 90 at the time of the start inspection. When the two dies 2 and 9 have been allowed to come closer, oil is injected/discharged to and from the hydraulic cylinder 83 of the roller 80 through the plug 89 so as to perform adjustment in such a manner that the two dies 2 and 9 are substantially aligned to each other. After that adjustment has been completed, the two dies 2 and 9 are clamped by aligning the positions of the guide pin 7 and the bush 8. At this time, confirmations are made whether or not the alignment of the two dies 2 and 9 has been performed normally and the alignment mechanism is being operated. If a satisfactory result is obtained, the molding operation is started.

In a case of the alignment mechanism shown in FIG. 3, the hollow piston 5 and spacer 23 are urged toward the stepped portion 22 by the conical spring 32. At this time, the tie bar 20 is moved to the left because pressurized oil is supplied to the cylinder chamber 4b from a pump (omitted from illustration) via the electromagnetic change-over valve or the like in accordance with a command supplied from a control portion such as a controller (omitted from illustration). Therefore, the left end surface 5a of the hollow piston 5 and the left end surface 4c of the cylinder chamber 4a of the stationary die plate 3 are positioned in contact with each other without any gap in the cylinder chamber 4a. At this time, the cylinder chamber 4b is blocked by the electromagnetic change-over valve or the like so that pressurized oil is not injected/delivered. In this state, pressurized oil is supplied from a hydraulic pump (omitted from illustration) to the die opening/closing hydraulic cylinder 90 so as to operate the two dies in the approach direction until they are stopped at positions which interpose a predetermined distance, at which the guide pin 7 is inserted into the bush 8. As an alternative to this, the two dies are stopped at the positions at which clamping has been performed. A detection is made by the position detection sensor 104 shown in FIG. 7 whether or not clamping of the dies has been performed normally. If an affirmative determination has been made, oil under pressure is supplied from the pump (omitted from illustration) to a hydraulic clamping machine 61 (shown in FIG. 2) so as to fasten the hydraulic clamping machine 61 and the tie bar 20 to each other. As a result, the tie bar 20 and the movable die plate assembly 40 are fastened to each other via the movable die plate support member 60.

After the two elements have been fastened to each other, oil under pressure is supplied to the cylinder chamber 4a in accordance with a command issued by the controller (omitted from illustration) so as to move the tie bar 20 to the right when viewed in FIG. 1. After the movement has been completed, oil under pressure is set in the cylinder chamber 4a by means of the relief valve or the like (omitted from illustration), so that a predetermined die-clamping force is generated in each of the two dies. When the die-clamping force has been generated, molten resin in injected between the two dies in a case of the injection molding machine. In a case of the injection compressive molding machine, the resin injected to a portion between the two dies is compressed from positions distant from each other by a predetermined interval so that the resin is compressed to be molded.

Even if the two dies are deviated from each other due to the difference in the degree of expansion caused from the difference between the temperature of the stationary die plate 3 and that of the movable die plate 50, the fastening load generated by the conical spring 32 is weak enough to take a vertical deviation between the tie bar 20 and the hollow piston 5 at the time of coupling the two dies by the die opening/closing hydraulic cylinder 90. Therefore, the two dies are not limited by the tie bars 20, and the two dies are clamped and aligned to each other in accordance with the position alignment made by the guide pin 7 and the bush 8. If the aforesaid deviation is too large to be absorbed by the tie bar 20 and the hollow piston 5, the alignment device 70 disposed between the movable die plate support member 60 and the hole 50a of the movable die plate 50 perform the alignment operation.

In a case of the automatic alignment mechanism shown in FIG. 4, the hollow piston 5 supplies oil under pressure from the pump 131 to the cylinder chamber 145 of the actuator 140 before it is fastened to the stepped portion 22 at the illustrated position via the spacer 23 due to the expansion of the actuator 140. Before the dies are clamped, the tie bar 20 is moved to the left by the oil under pressure supplied to the cylinder chamber 4b in accordance with a command supplied from the controller (omitted from illustration) so that the left end surface 5a of the hollow piston 5 and the left end surface 4c of the cylinder chamber 4a of the stationary die plate 3 are positioned in contact with each other without any gap in the cylinder chamber 4a. At this time, flow of hydraulic fluid to/from the cylinder chamber 4b is blocked by an electromagnetic change-over valve or the like (omitted from illustration) so that no pressurized oil is injected/discharged. Although the actuator 140 is expanded as usual, a gap may be present between the actuator 140 and the nut 33 in a direction parallel to the axial direction since the actuator 140 is not expanded. In this state, oil under pressure is supplied from the hydraulic pump (omitted from illustration) to the die opening/closing hydraulic cylinder 90 so that the two dies are clamped. If a determination has been made by the position detection sensor 104 that the two dies have approached each other and that the guide pin 7 and the bush 8 have been engaged by a predetermined length, a command is transmitted from the controller to the electromagnetic change-over valve (omitted from illustration) of the die opening/closing hydraulic cylinder 90 so as to temporarily stop the operation of the die opening/closing hydraulic cylinder 90. Furthermore, the electromagnetic change-over valve 132 connected to the actuator 140 is changed over to the port B so as to discharge pressurized oil from the actuator 140. As a result, an axial directional deviation is generated between the tie bar 20 and the hollow piston 5 so that the two dies are clamped in accordance with the aligned position made by the guide pin 7 and the bush 8. Consequently, the two dies are aligned to each other.

Another arrangement may be employed in which the die opening/closing hydraulic cylinder 90 is not temporarily stopped, and the deviation is generated between the tie bar 20 and the hollow piston 5 by discharging pressurized oil in the actuator while operating the die opening/closing hydraulic cylinder 90. After the alignment has been completed, the electromagnetic change-over valve 132 is changed over to the port A so as to expand the actuator 140. As a result, the actuator 140 and the nut 33 are brought into contact with each other. A determination is made by the position detection sensor 104 shown in FIG. 7 as to whether or not the die-clamping operation has been performed normally. If an affirmative result has been detected, oil under pressure is supplied to the pressure clamping machine 61 from the pump (omitted from illustration) similarly to the aforesaid embodiment so that the tie bar 20 and the movable die plate assembly 40 are fastened to each other. Then, the injection molding or the injection compressive molding process is performed similarly to the aforesaid embodiment.

In a case of the automatic alignment mechanism shown in FIG. 5, oil under pressure is supplied from the pump (omitted from illustration) to the cylinder chamber 4b via the electromagnetic change-over valve or the like in accordance with a command issued from the controller (omitted from illustration) so that the tie bar 20 is moved to the left. As a result, the left end surface 5a of the hollow piston 5 and the left end surface 4c of the cylinder chamber 4a of the stationary die plate are positioned in contact with each other without any gap in the cylinder chamber 4a. The structure shown in FIG. 3 may be so arranged that the tie bar 20 and the hollow piston 5 are integrally formed with each other, the hollow piston 5 is hermetically inserted into the cylinder chamber 4 of the stationary die plate 3 without any vertical and/or lateral gap, and the alignment mechanism is omitted from the structure.

In the aforesaid state, oil under pressure is supplied from the hydraulic pump (omitted from illustration) to the die opening/closing hydraulic cylinder 90 so as to clamp the two dies. When determinations have been made by the position detection sensor 104 that the two dies have approached each other and that the guide pin 7 and the bush 8 have been engaged by a predetermined length, a command is transmitted from the controller to the electromagnetic change-over valve of the die opening/closing hydraulic cylinder 90 so as to temporarily stop the operation of the die opening/closing hydraulic cylinder 90. Furthermore, the electromagnetic valve is changed over similarly to the structure shown in FIG. 4 so as to discharge the oil under pressure from the actuator 240. As a result, a deviation is generated between the tie bar 20 and the support plate 295 supported via the tie bar plate 231 so that dies are clamped in accordance with the positional alignment established by the guide pin 7 and the bush 8. Hence, the alignment of the two dies are performed.

At this time, the deviation may be generated by discharging pressurized oil from the actuator in such a manner that the die opening/closing hydraulic cylinder 90 is not temporarily stopped but the same is operated. After the alignment has been completed, the actuator 240 is expanded so that the tie bar plate 231 is brought into contact with the support plate 295 by the actuator 240 and the tie bar 20 is supported by the hole 231a hermetically formed in the tie bar plate 231. As a result, the alignment is performed. Then, the die opening/closing hydraulic cylinder 90 causes the movable die to approach the stationary die. A determination is made by the position detection sensor 104 shown in FIG. 7 as to whether or not clamping has been performed normally. If clamping has been performed normally, oil under pressure is supplied from the pump (omitted from illustration) to the pressure clamping machine 61 so as to fasten the tie bar 20 and the movable die plate assembly 40 to each other. Then, the injection molding or the injection compressive molding process is performed similarly to the aforesaid embodiment.

In a case where the alignment according to the aforesaid embodiment is employed in the molding apparatus, the necessity of using all three of the alignment mechanism 30 or 130, the alignment mechanism 70, and the alignment mechanism 230 can be omitted, and they can be utilized individually or combined with one or more other alignment mechanisms. Furthermore, the detection devices may also be combined with each other.

Although the invention has been described in its preferred form with a certain degree of particularly, it is understood that the present disclosure of the preferred form can be changed as to the details of construction and the combination and arrangement of parts without departing from the spirit and the scope of the invention as hereinafter claimed.

What is claimed is:

1. Molding apparatus comprising:

a stationary die plate for holding a stationary die, a movable die plate for holding a movable die, an opening/closing hydraulic cylinder for moving said movable die plate forwardly/rearwardly with respect to said stationary die plate to thereby open/close the dies, a die-clamping hydraulic cylinder comprising a hollow piston slidably positioned in a hydraulic chamber in said stationary die plate, wherein said hollow piston is a double rod piston having a hollow hole extending coaxially therethrough, a tie bar for calming said movable die and said stationary die by the die-clamping force generated by said die-clamping hydraulic cylinder, said tie bar extending through said hollow piston, and an alignment mechanism associated with said tie bar so as to join said movable die and said stationary die via said tie bar in such a manner that alignment of the movable die held on said movable die plate and the stationary die held on said stationary die plate can be performed, said alignment mechanism comprising a flexible first alignment device connecting a portion of said tie bar to the end of said hollow piston remote from said movable die plate regardless of the position of said movable die plate, wherein said portion of said tie bar has a threaded portion, and wherein said flexible first alignment device comprises a threaded element which is threadedly engaged with said threaded portion of said tie bar, and at least one conical spring positioned about said tie bar between said threaded element and said end of said hollow piston 2. Apparatus in accordance with claim 1, further comprising an element presenting a rolling guide surface, a roller, and adjustable mounting means for mounting said roller to said movable die plate so that said roller moves on said rolling guide surface, said adjustable mounting means being adapted to vary the distance of said movable die plate from said rolling guide surface.

3. Apparatus in accordance with claim 1, further comprising a detection mechanism for detecting at least one of the inclination deviation, positional deviation and alignment deviation of the movable die plate, and for stopping the operation of said movable die plate when an excessively large deviation of said movable die plate is detected, said inclination deviation being any deviation of the movable die plate from a vertical plane, said positional deviation being any deviation from a desired spacing between the movable die and the stationary die in the axial direction, and said alignment deviation being any deviation in the alignment of the longitudinal axis of the movable die with the longitudinal axis of the stationary die.

4. Apparatus in accordance with claim 1 wherein said threaded element is a threaded nut, having a slit formed therein, and a bolt positioned across said slit so as to secure said nut to a predetermined position on the tie bar.

5. Apparatus in accordance with claim 1, further comprising a movable die plate support member extending through a hole in said movable die plate for supporting said movable die plate, the diameter of said hole in said movable die plate being greater than the diameter of the portion of said movable die plate support member in said hole in said movable die plate so as to provide a gap between said movable die plate and said movable die plate support member, wherein said tie bar extends through a hole in said movable die plate support member to said stationary die plate to guide said movable die plate support member and to provide for clamping said movable die and said stationary die by the die-clamping force generated by said die-clamping hydraulic cylinder, and a second alignment device, said second alignment device joining said movable die plate to said movable die plate support member in such a manner that the alignment of said movable die plate with respect to said tie bar can be performed.

6. Apparatus in accordance with claim 5, wherein said movable die plate support member is elongated along the axis of said tie bar from said movable die plate toward said stationary die plate, and wherein regardless of the position of the movable die plate said tie bar extends beyond the end of said movable die plate support member which is remote from said stationary die plate, thereby extending the distance along which said movable die plate support member is supported on said tie bar and providing greater accuracy of the alignment of the movable die plate with respect to the stationary die plate.

7. Apparatus in accordance with claim 5, further comprising a support plate, and a third alignment device, said movable die plate being positioned between said stationary die plate and said support plate, said third alignment device joining said tie bar to said support plate, regardless of the position of said movable die plate, in such a manner that alignment of said tie bar with respect to said support plate can be performed.

8. Apparatus in accordance with claim 7, wherein said apparatus is positioned on and supported by a bed, and wherein said support plate is secured to said bed, and wherein a portion of said tie bar is, in an axial direction, slidably positioned in a boss hole in said support plate regardless of the position of said movable die plate, the diameter of said boss hole being greater than the diameter of the portion of said tie bar in said boss hole so that said tie bar can be freely moved with respect to said support plate.

9. Apparatus in accordance with claim 7, wherein said apparatus is positioned on and supported by a bed, and wherein said support plate is slidably positioned on said bed, wherein a portion of said tie bar is, in an axial direction, slidably positioned in a boss hole in said support plate regardless of the position of said movable die plate, and wherein said third alignment device comprises a tie bar plate secured to said tie bar and in contact with the side of said support plate which is remote from said stationary die plate, a cover mounted on said support plate so as to enclose said tie bar plate, and a hydraulic actuator positioned between said tie bar plate and said cover.

10. Apparatus in accordance with claim 9 wherein said hydraulic actuator has a housing forming a hydraulic chamber and a piston rod slidably positioned in the hydraulic chamber of said hydraulic actuator, with said housing of said hydraulic actuator being mounted to one of said cover and said tie bar plate and said piston rod of said hydraulic actuator being mounted to the other of said cover and said tie bar plate, and means for applying hydraulic fluid under pressure to said hydraulic chamber of said hydraulic actuator.

11. Apparatus in accordance with claim 1, wherein said apparatus is positioned on and supported by a bed and further comprises a support plate and a second alignment device; said movable die plate being positioned between said stationary die plate and said support plate, said support plate being secured to said bed, a portion of said tie bar being, in an axial direction, slidably positioned in a boss hole in said support plate regardless of the position of said movable die plate, the diameter of said boss hole being greater than the diameter of the portion of said tie bar in said boss hole so that said tie bar can be freely moved with respect to said support plate, said second alignment device joining said tie bar to said support plate regardless of the position of said movable die plate in such a manner that alignment of said tie bar with respect to said support plate can be performed.

12. Apparatus in accordance with claim 1, wherein said apparatus is positioned on and supported by a bed and further comprises a support plate and a second alignment device; said movable die plate being positioned between said stationary die plate and said support plate, said support plate being slidably positioned on said bed, a portion of said tie bar being, in an axial direction, slidably positioned in a boss hole in said support plate regardless of the position of said movable die plate, the diameter of said boss hole being greater than the diameter of the portion of said tie bar in said boss hole so that said tie bar can be freely moved with respect to said support plate, said second alignment device joining said tie bar to said support plate regardless of the position of said movable die plate in such a manner that alignment of said tie bar with respect to said support plate can be performed, said second alignment device comprising a tie bar plate secured to said tie bar and in contact with the side of said support plate which is remote from said stationary die pate, a cover mounted on said support plate so as to enclose said tie bar plate, and a second hydraulic actuator positioned between said tie bar plate and said cover.

13. Molding apparatus comprising:
   a stationary die plate for holding a stationary die, a movable die plate for holding a movable die,
   an opening/closing hydraulic cylinder for moving said movable die plate forwardly/rearwardly with respect to said stationary die plate to thereby open/close the dies,
   a die-clamping hydraulic cylinder comprising a hollow piston slidably positioned in a hydraulic chamber in said stationary die plate,
   a tie bar for clamping said movable die and said stationary die by the die-clamping force generated by said die-clamping hydraulic cylinder, said tie bar extending through said hollow piston, and
   an alignment mechanism associated with said tie bar so as to join said movable die and said stationary die via said tie bar in such a manner that alignment of the movable die held on said movable die plate and the stationary die held on said stationary die plate can be performed, said alignment mechanism comprising a flexible first alignment device connecting a portion of said tie bar to the end of said hollow piston remote from said movable die plate regardless of the position of said movable die plate, wherein said flexible first alignment device comprises a first hydraulic actuator positioned between said hollow piston and said portion of said tie bar, said first hydraulic actuator having a housing forming a hydraulic chamber and a piston rod slidably positioned in the hydraulic chamber of said first hydraulic actuator, with said housing of said first hydraulic actuator being mounted to one of said hollow piston and said portion of said tie bar and said piston rod of said first hydraulic actuator being mounted to the other of said hollow piston and said portion of said tie bar, and means for applying hydraulic fluid under pressure to said hydraulic chamber of said first hydraulic actuator.

14. Apparatus in accordance with claim 13, further comprising:
   a movable die plate support member extending through a hole in said movable die plate for supporting said movable die plate, the diameter of said hole in said movable die plate being greater than the diameter of the portion of said movable die plate support member in said hole in said movable die plate so as to provide a gap between said movable die plate and said movable die plate support member, wherein said tie bar extends through a hole in said movable die plate support member to said stationary die plate to guide said movable die plate support member and to provide for clamping said movable die and said stationary die by the die-clamping force generated by said die-clamping hydraulic cylinder, and
   a second alignment device, said second alignment device joining said movable die plate to said movable die plate support member in such a manner that the alignment of said movable die plate with respect to said tie bar can be performed.

15. Apparatus in accordance with claim 14, wherein said movable die plate support member is elongated along the axis of said tie bar from said movable die plate toward said stationary die plate, and wherein, regardless of the position of the movable die plate, said tie bar extends beyond the end of said movable die plate support member which is remote from said stationary die plate, thereby extending the distance along which said movable die plate support member is supported on said tie bar and providing greater accuracy of the alignment of the movable die plate with respect to the stationary die plate. comprises a shoulder on said movable die plate support member at the side of said movable die plate remote from said stationary die plate, a portion of said movable die plate support member between said shoulder and said stationary die plate having external threads, and a threaded element in threaded engagement with the threads on said movable die plate support member to secure said movable die plate between said shoulder and said threaded element in such a manner that alignment of said movable die plate with respect to said tie bar can be performed.

16. Apparatus in accordance with claim 14, further comprising a support plate, and a third alignment device, said movable die plate being positioned between said stationary die plate and said support plate, said third alignment device joining said tie bar to said support plate, regardless of the position of said movable die plate, in such a manner that alignment of said tie bar with respect to said support plate can be performed.

17. Apparatus in accordance with claim 16, wherein said apparatus is positioned on and supported by a bed, wherein said support plate is secured to said bed, and wherein a portion of said tie bar is, in an axial direction, slidably positioned in a boss hole in said support plate regardless of the position of said movable die plate, the diameter of said boss hole being greater than the diameter of the portion of said tie bar in said boss hole so that said tie bar can be freely moved with respect to said support plate.

18. Apparatus in accordance with claim 16, wherein said apparatus is positioned on and supported by a bed, and wherein said support plate is slidably positioned on said bed, wherein a portion of said tie bar is, in an axial direction, slidably positioned in a boss hole in said support plate regardless of the position of said movable die plate, and wherein said third alignment device comprises a tie bar plate secured to said tie bar and in contact with the side of said support plate which is remote from said stationary die plate, a cover mounted on said support plate so as to enclose said tie bar plate, and a second hydraulic actuator positioned between said tie bar plate and said cover.

19. Apparatus in accordance with claim 18 wherein said second hydraulic actuator has a housing forming a hydraulic chamber and a piston rod slidably positioned in the hydraulic chamber of said second hydraulic actuator, with said housing of said second hydraulic actuator being mounted to one of said cover and said tie bar plate and said piston rod of said second hydraulic actuator being mounted to the other of said cover and said tie bar plate, and means for applying hydraulic fluid under pressure to said hydraulic chamber of said second hydraulic actuator.

20. Apparatus in accordance with claim 13, further comprising a support plate, and a second alignment device, said movable die plate being positioned between said stationary die plate and said support plate, said second alignment device joining said tie bar to said support plate, regardless of the position of said movable die plate, in such a manner that alignment of said tie bar with respect to said support plate can be performed.

21. Apparatus in accordance with claim 20, wherein said apparatus is positioned on and supported by a bed, and wherein said support plate is secured to said bed, and wherein a portion of said tie bar is, in an axial direction, slidably positioned in a boss hole in said support plate regardless of the position of said movable die plate, the diameter of said boss hole being greater than the diameter of the portion of said tie bar in said boss hole so that said tie bar can be freely moved with respect to said support plate.

22. Apparatus in accordance with claim 20, wherein said apparatus is positioned on and supported by a bed, and wherein said support plate is slidably positioned on said bed, wherein a portion of said tie bar is, in an axial direction, slidably positioned in a boss hole in said support plate regardless of the position of said movable die plate, and wherein said second alignment device comprises a tie bar plate secured to said tie bar and in contact with the side of said support plate which is remote from said stationary die plate, a cover mounted on said support plate so as to enclose said tie bar plate, and a second hydraulic actuator positioned between said tie bar plate and said cover.

23. Apparatus in accordance with claim 22 wherein said second hydraulic actuator has a housing forming a hydraulic chamber and a piston rod slidably positioned in the hydraulic chamber of said second hydraulic actuator, with said housing of said second hydraulic actuator being mounted to one of said cover and said tie bar plate and said piston rod of said second hydraulic actuator being mounted to the other of said cover and said tie bar plate, and means for applying hydraulic fluid under pressure to said hydraulic chamber of said second hydraulic actuator.

24. Molding apparatus comprising:
   a stationary die plate for holding a stationary die, a movable die plate for holding a movable die, an opening/closing hydraulic cylinder for moving said movable die plate forwardly/rearwardly with respect to said stationary die plate to thereby open/close the dies, a die-clamping hydraulic cylinder comprising a hollow piston slidably positioned in a hydraulic chamber in said stationary die plate, a tie bar for clamping said movable die and said stationary die by the die-clamping force generated by said die-clamping hydraulic cylinder, said tie bar extending through said hollow piston, a movable die plate support member extending through a hole in said movable die plate for supporting said movable die pate, the diameter of said hole in said movable die plate being greater than the diameter of the portion of said movable die plate support member in said hole so as to provide a gap between said movable die plate and said movable die plate support member, wherein said tie bar extends through a hole in said movable die plate support member to said stationary die plate to guide said movable die plate support member and to provide for clamping said movable die and said stationary die by the die-clamping force generated by said die-clamping hydraulic cylinder, wherein said movable die plate support member is elongated along the axis of said tie bar from said movable die plate toward said stationary die plate, and wherein regardless of the position of the movable die plate said tie bar extends beyond the end of said movable die plate support member which is remote from said stationary die plate, thereby extending the distance along which said movable die plate support member is supported on said tie bar and providing greater accuracy of the alignment of the movable die plate with respect to the stationary die plate, a first alignment mechanism associated with said tie bar so as to join said movable die and said stationary die via said tie bar in such a manner that alignment of the movable die held on said movable die plate and the stationary die held on said stationary die plate can be performed, said first alignment mechanism comprising a flexible first alignment device connecting a portion of said tie bar to the end of said hollow piston remote from said movable die plate regardless of the position of said movable die plate, and a second alignment device, said second alignment device joining said movable die plate to said movable die plate support member in such a manner that the alignment of said movable die plate with respect to said tie bar can be performed, and at least two ball bearings positioned between said movable die plate support member and said tie bar at spaced apart locations along the length of said tie bar, thereby permitting said movable die plate to slide in the axial direction of said tie bar in response to the action of the opening/closing hydraulic cylinder while using the tie bar as a guide.

25. Apparatus in accordance with claim 24, further comprising a hydraulic fastening device for selectively fastening said movable die plate support member and said tie bar to each other.

26. Apparatus in accordance with claim 25, wherein said second alignment device joining said movable die plate to said movable die plate support member comprises a shoulder on said movable die plate support member at the side of said movable die plate remote from said stationary die plate, a portion of said movable die plate support member between said shoulder and said stationary die plate having external threads, and a threaded element in threaded engagement with the threads on said movable die plate support member to secure said movable die plate between said shoulder and said threaded element in such a manner that alignment of said movable die plate with respect to said tie bar can be performed.

27. Apparatus in accordance with claim 24 wherein said flexible first alignment device comprises an element secured to said tie bar, and a spring positioned between said element and said end of said hollow piston.

28. Molding apparatus comprising:

a stationary die plate for holding a stationary die, a movable die plate for holding a movable die, an opening/closing hydraulic cylinder for moving said movable die plate forwardly/rearwardly with respect to said stationary die plate to thereby open/close the dies, a die-clamping hydraulic cylinder, movable die plate support member extending through a hole in said movable die plate for supporting said movable die plate, the diameter of said hole in said movable die plate being greater than the diameter of the portion of said movable die plate support member in said hole so as to provide a gap between said movable die plate and said movable die plate support member, a tie bar extending through a hole in said movable die plate support member to said stationary die plate to guide said movable die plate support member and to provide for clamping said movable die and said stationary die by the die-clamping force generated by said die-clamping hydraulic cylinder, wherein said movable die plate support member is elongated along the axis of said tie bar from said movable die plate toward said stationary die plate, and wherein regardless of the position of the movable die plate said tie bar extends beyond the end of said movable die plate support member which is remote from said stationary die plate, thereby extending the distance along which said movable die plate support member is supported on said tie bar and providing greater accuracy of the alignment of the movable die plate with respect to the stationary die plate, and a first alignment device joining said movable die plate to said movable die plate support member in such a manner that the alignment of said movable die plate with respect to said tie bar can be performed, and at least two ball bearings positioned between said movable die plate support member and said tie bar at spaced apart locations along the length of said tie bar, thereby permitting said movable die plate to slide in the axial direction of said tie bar in response to the action of the opening/closing hydraulic cylinder while using the tie bar as a guide.

29. Apparatus in accordance with claim 28, further comprising a hydraulic fastening device for selectively fastening said movable die plate support member and said tie bar to each other.

30. Apparatus in accordance with claim 29, wherein said first alignment device joining said movable die plate to said movable die plate support member comprises a shoulder on said movable die plate support member at the side of said movable die plate remote from said stationary die plate, a portion of said movable die plate support member between said shoulder and said stationary die plate having external threads, and a threaded element in threaded engagement with the threads on said movable die plate support member to secure said movable die plate between said shoulder and said threaded element in such a manner that alignment of said movable die plate with respect to said tie bar can be performed.

31. Apparatus in accordance with claim 28, wherein said first alignment device joining said movable die plate to said movable die plate support member comprises a shoulder on said movable die plate support member at the side of said movable die plate remote from said stationary die plate, a portion of said movable die plate support member between said shoulder and said stationary die plate having external threads, and a threaded element in threaded engagement with the threads on said movable die plate support member to secure said movable die plate between said shoulder and said threaded element in such a manner that alignment of said movable die plate with respect to said tie bar can be performed.

32. Apparatus in accordance with claim 28, further comprising a support plate, and a second alignment device, said movable die plate being positioned between said stationary die plate and said support plate, said second alignment device joining said tie bar to said support plate, regardless of the position of said movable die plate, in such a manner that alignment of said tie bar with respect to said support plate can be performed.

33. Apparatus in accordance with claim 32, wherein said apparatus is positioned on and supported by a bed, wherein said support plate is secured to said bed, and wherein a portion of said tie bar is, in an axial direction, slidably positioned in a boss hole in said support plate regardless of the position of said movable die plate, the diameter of said boss hole being greater than the diameter of the portion of said tie bar in said boss hole so that said tie bar can be freely moved with respect to said support plate.

34. Apparatus in accordance with claim 32, wherein said apparatus is positioned on and supported by a bed, wherein said support plate is slidably positioned on said bed, wherein a portion of said tie bar is, in an axial direction, slidably positioned in a boss hole in said support plate regardless of the position of said movable die plate, and wherein said second alignment device comprises a tie bar plate secured to said tie bar and in contact with the side of said support plate which is remote from said stationary die plate, a cover mounted on said support plate so as to enclose said tie bar plate, and a hydraulic actuator positioned between said tie bar plate and said cover.

35. Apparatus in accordance with claim 28, further comprising an element presenting a rolling guide surface, a roller, and adjustable mounting means for mounting said roller to said movable die plate so that said roller moves on said rolling guide surface, said adjustable mounting means being adapted to vary the distance of said movable die plate from said rolling guide surface.

36. Apparatus in accordance with claim 28, further comprising a detection mechanism for detecting at least one of the inclination deviation, positional deviation and alignment deviation of the movable die plate, and for stopping the operation of said movable die plate when an excessively large deviation of said movable die plate is detected, said inclination deviation being any deviation of the movable die plate from a vertical plane, said positional deviation being any deviation from a desired spacing between the movable die and the stationary die in the axial direction, and said alignment deviation being any deviation in the alignment of the longitudinal axis of the movable die with the longitudinal axis of the stationary die.

* * * * *

UNITED STATES PATENT AND TRADEMARK OFFICE
CERTIFICATE OF CORRECTION

PATENT NO. : 5,338,171
DATED : August 16, 1994
INVENTOR(S) : Kohji HAYAKAWA et al It is certified that error appears in the above-indentified patent and that said Letters Patent is hereby corrected as shown below:

Column 16, line 12, delete "calming" and insert --clamping--.

Column 18, line 32, delete "pate," and insert --plate,--.

Column 19, line 40, after "die plate." delete --comprises a shoulder on said movable die plate support member at the side of said movable die plate remote from said stationary die plate, a portion of said movable die plate support member between said shoulder and said stationary die plate having external threads, and a threaded element in threaded engagement with the threads on said movable die plate support member to secure said movable die plate between said shoulder and said threaded element in such a manner that alignment of said movable die plate with respect to said tie bar can be performed.--

Column 21, line 15, delete "pate," and insert --plate,--.

Column 22, line 24, before "movable" insert --a--.

Signed and Sealed this

First Day of November, 1994

Attest:

BRUCE LEHMAN

Attesting Officer       Commissioner of Patents and Trademarks